Patented July 18, 1950

2,515,728

UNITED STATES PATENT OFFICE 2,515,728

RING SYSTEMS FROM AZO DYES

Jack F. Morgan, Delmar, N. Y., and Harry W. Grimmel, Providence, R. I., assignors to General Aniline & Film Corporation, New York, N. Y., a corporation of Delaware No Drawing. Application September 21, 1948, Serial No. 50,444

9 Claims. (Cl. 260—248)

This invention relates to novel polynuclear N-heterocyclic compounds and to a process for preparing them.

In accordance with this invention, novel heterocyclic compounds of the class consisting of naphtho - [2,1 - e] - tetrazolo - [5,1 - c] - as - triazines and naphtho-[2,1-e]-s-triazolo-[5,1-c]-as-triazines, having the following nuclear structure:

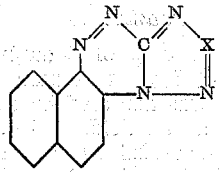

wherein X represents tetravalent carbon or trivalent nitrogen, are obtained by coupling a compound of the class consisting of diazotized 5-aminotetrazole and diazotized 5-amino-s-triazoles (i. e., 5-amino-1,2,4-triazoles) with a β-naphthylamine compound susceptible to coupling in the alpha-position ortho to the β-amino group; and effecting ring closure of the resulting azo compound by elimination of the β-amino group and a hydrogen atom (forming ammonia or an amine). The polynuclear N-heterocyclic compounds thus obtained are valuable intermediates for organic syntheses, particularly for the synthesis of organic dyestuffs. Some of the products themselves have dyeing properties.

β-naphthylamine compounds suitable for preparing the azo compounds employed as intermediates for the products of this invention include β-naphthylamine, N-monoalkyl-β-naphthylamines, and nuclearly substituted derivatives of these amines in which the substituents do not interfere with coupling of the diazotized aminotetrazole or amino-s-triazole exclusively in the alpha-position ortho to the β-amino group, or with elimination of the β-amino group to effect ring closure. Suitable nuclear substituents include halogen, nitro, sulfo and carboxy groups, of which the first two may occupy any nuclear position other than the alpha-position ortho to the β-amino group, while the sulfo and carboxy groups may occupy any nuclear position except the two positions ortho to the β-amino group (since the presence of an acidic substituent in 3-position of a 2-naphthylamine prevents ring closure). β-naphthylamine compounds containing a nuclear hydroxyl group are generally unsuitable, since the hydroxyl group usually activates a second nuclear position for coupling, and thus interferes with coupling of the diazotized amino triazole or tetrazole exclusively in the alpha-position ortho to the β-amino group.

5-amino-s-triazole compounds serving as starting materials in preparing the aforesaid azo intermediates for the products of this invention include unsubstituted 5-amino-s-triazole and nuclear substitution products thereof containing substituents such as an alkyl group (e. g., a methyl or ethyl group) or a carboxy group in the 3-position.

In preparing the intermediate azo compounds, 5-aminotetrazole or the 5-amino-s-triazole compound is diazotized in the usual manner by treatment with nitrous acid at low temperature, and the resulting diazo compound is coupled in acid medium with a β-naphthylamine compound of the class specified above. The resulting azo compound is then subjected to ring closing treatment, adapted to eliminate the β-amino group of the naphthylamine compound. For this purpose, the azo compound is preferably heated in an aqueous solution of strong mineral acid such as sulfuric acid or hydrochloric acid. The β-amino group is eliminated with formation of an ammonium or alkylamine salt. The resulting polynuclear N-heterocyclic compound is separated from the reaction mixture, e. g., by salting out, if necessary, and filtration. The crude product can be purified by the usual methods ordinarily involving recrystallization from a suitable solvent.

The preparation of compounds within the purview of this invention is illustrated by the following examples.

Example 1

25.5 g. of 5-aminotetrazole were diazotized by dissolving in 250 cc. of water containing 22 g. of anhydrous sodium carbonate dissolved therein, adding 21 g. of sodium nitrite in 30% aqueous solution, and slowly adding the resulting solution to an agitated mixture of 450 cc. of water, 450 g. of ice and 80 cc. of concentrated hydrochloric acid, while maintaining the temperature at or below 0° C. After 15 minutes, the resulting solution of diazotized 5-aminotetrazole was added to an agitated solution of 43 g. of β-naphthylamine in a mixture of 30 cc. of concentrated hydrochloric acid and 1500 cc. of water. After stirring for 30 minutes, the insoluble red azo compound which separated was recovered by filtration. The filter cake was added to a solution of 250 cc. of concentrated sulfuric acid in 2000 cc. of water, and the resulting mixture was heated at 90° to 100° C., while agitating, for 1 to 3 hours. The color of the suspended solids in the reaction mixture changed during this treatment from red to yellow. The reaction mixture was then filtered, and the filter cake washed with water and dried. The crude product thus obtained amounted to 50 g. or 75% of theory. Upon crystallization of the product from dioxane, a pale yellow crystalline material was recovered, having the following analysis:

|   | Calculated | Found |
|---|---|---|
|   | Per cent | Per cent |
| C | 59.46 | 59.55 |
| H | 2.72 | 2.72 |
| N | 37.82 | 37.87 | corresponding to the empirical formula $C_{11}H_6N_6$.

The reaction occurring in the foregoing ring closure treatment can be formulated as follows:

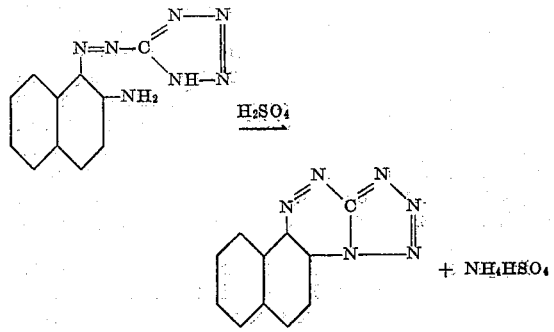

The resulting product is thus naphtho-[2,1-e]-tetrazolo-[5,1-c]-as-triazine.

Example 2

12.8 g. of 5-amino-1,2,4-triazole-3-carboxylic acid were dissolved by warming in a mixture of 50 cc. of concentrated hydrochloric acid and 100 cc. of water. The solution was cooled to —5° C. and 7 g. of sodium nitrite in 30% aqueous solution were added while maintaining the temperature below 0° C. The resulting slurry was added to an agitated solution of 14.3 g. of β-naphthylamine in a mixture of 15 cc. of concentrated hydrochloric acid and 1000 cc. of water. After stirring for 15 minutes, a red slurry was obtained, to which 75 cc. of concentrated hydrochloric acid were added. The mixture was heated at boiling temperature for 2 to 3 hours, and filtered. The resulting insoluble light tan colored product was separated by filtration, washed with water and dried. A quantitative yield of the crude product was thereby obtained. A sample of the product was dissolved in dilute aqueous sodium bicarbonate solution, treated with charcoal, reprecipitated by acidifying with acetic acid, separated from the solution by filtration, and crystallized from 95% dioxane. The purified product was a light yellow crystalline solid, and was found to have the following composition upon analysis:

|   | Calculated | Found |
|---|---|---|
| C ..........per cent.. | 58.86 | 59.04 |
| N ..........per cent.. | 26.41 | 26.65 |
| Neutralization Equivalent | 265.2 | 262.4 | corresponding to the empirical formula $C_{13}H_7O_2N_5$

The reaction occurring in the ring closing treatment of this example may be formulated as follows:

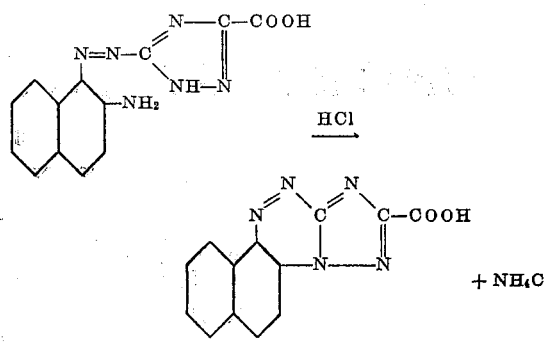

The compound of this example is thus naphtho-[2,1-e]-3-carboxy-s-triazolo-[5,1-c] - as-triazine.

Azo compounds derivated from diazotized 5-amino-s-triazole or its 3-methyl derivative, by coupling with β-naphthylamine, when subjected to ring closure in the same manner as that illustrated in Example 2, yield respectively the corresponding unsubstituted naphtho-[2,1-e]-s-triazolo-[5,1-c]-as-triazine, or the 3-methyl derivative thereof.

Example 3

A solution of 22.3 g. of 2-naphthylamine-6-sulfonic acid and 5 g. of sodium hydroxide in 500 cc. of water was acidified by adding thereto 12 cc. of glacial acetic acid. 8.5 g. of 5-aminotetrazole were diazotized by the procedure outlined in Example 1, and added to the acidified solution of 2-naphthylamine-6-sulfonic acid. After stirring for 30 minutes, to complete the coupling reaction, 50 cc. of concentrated sulfuric acid were added, and the resulting reddish orange slurry was heated at 90° C. for 1 hour. A greenish yellow solution was obtained which was partially neutralized by adding 60 g. of sodium hydroxide in the form of a 30% aqueous solution, and then treated with 200 g. of sodium sulfate. The crude light yellow product which separated from the solution was isolated by filtration. To purify the product, it was dissolved in 500 to 600 cc. of hot water made slightly alkaline with sodium bicarbonate. The solution was treated with charcoal, filtered, and gradually cooled. The purified sodium salt of the product crystallized from the solution in the form of light yellow crystals, having the following structure:

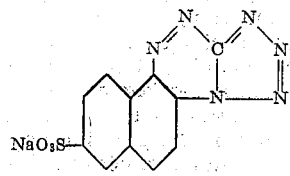

The product is thus 6-sulfo-naphtho-[2,1-e]-tetrazolo-[5,1-c]-as-triazine.

Analysis of the product yielded the following results:

|   | Calculated | Found |
|---|---|---|
|   | Per cent | Per cent |
| N | 25.91 | 25.87 |
| S | 9.88 | 9.81 |

It was found that the product possessed affinity for wool in dyeing treatments.

Corresponding 6-sulfo-naphtho-s-triazolo-as-triazine compounds are obtained, as illustrated in Example 2, upon using 5-amino-1,2,4-triazole or its 3-carboxy or 3-methyl derivative instead of 5-aminotetrazole as the starting material in the foregoing example.

Other β-naphthylamine compounds which can be substituted for the β-naphthylamine or 2-naphthylamine-6-sulfonic acid of the foregoing examples, include the following:

2-naphthylamine-4-sulfonic acid
    2-naphthylamine-5-sulfonic acid
    2-naphthylamine-6-sulfonic acid
    2-naphthylamine-7-sulfonic acid
    2-naphthylamine-8-sulfonic acid
    2-naphthylamine-4,8-disulfonic acid
    2-naphthylamine-5,7-disulfonic acid
    2-naphthylamine-6,8-disulfonic acid
    2-naphthylamine-4,6,8-trisulfonic acid
    5-nitro-2-naphthylamine
    8-nitro-2-naphthylamine
    4-bromo-2-naphthylamine
    7-amino-2-naphthoic acid
    N-methyl-2-naphthylamine
    N-ethyl-2-naphthylamine When N-alkyl (e. g., N-methyl or N-ethyl) β-naphthylamines are used, the ring closure occurs in the same manner as illustrated in the examples, except that an alkyl amine salt is formed as the by-product instead of an ammonium salt.

As indicated in the examples and the foregoing table, β-naphthylamine compounds which are suitable as starting materials have the alpha-position ortho to the β-amino group unoccupied to permit coupling in this position with the diazotized amino-triazole or -tetrazole. Neutral substituents such as nitro groups or halogens (e. g., chlorine or bromine) can occupy any of the other nuclear positions, while acid substituents such as carboxy or sulfo groups can occupy any position other than the two positions ortho to the β-amino group. It has been found that an acid group (sulfo or carboxy) in the 3-position of a 2-naphthylamine interferes with elimination of the 2-amino group required for ring closure, possibly by reason of the formation of an inner salt of the amino group.

Hydroxyl groups are not included as nuclear substituents of suitable β-naphthylamines, since they generally interfere with coupling of the diazo compound exclusively in the alpha-position ortho to the β-amino group. Hydroxyl groups can be introduced into the naphthalene nucleus of the final product, however, by conventional methods, such as reduction of a nitro group to an amino group, diazotization, and hydrolysis of the diazonium compound.

In carrying out the ring closure of this invention, a strong acid, preferably a mineral acid such as hydrochloric or sulfuric acid is used, in an amount equivalent to at least one equivalent per mol of azo compound. The reaction is accelerated by the presence of excess acid and accordingly, an excess is preferably used. While heating at lower temperatures is effective for causing ring closure, temperatures from 90° to 100° C. are preferred to insure a more rapid reaction. It has been shown experimentally that one mol of ammonia or alkylamine is eliminated for each mol of azo compound, thus providing additional evidence of the correctness of the foregoing formation of the reaction.

Variations and modifications, obvious to those skilled in the art, can be made in the foregoing compounds and process without departing from the scope of the invention.

We claim:

1. A polynuclear heterocyclic compound of the class consisting of naphtho-[2,1-e]-s-triazolo-[5,1-c]-as-triazines, and naphtho-[2,1-e]-tetrazolo-[5,1-c]-as-triazines, of which the nucleus has the following structure:

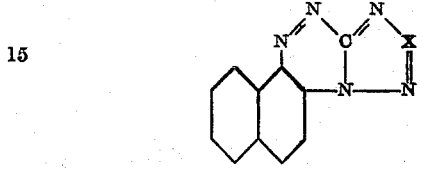

wherein X represents a member of the group consisting of trivalent nitrogen and tetravalent carbon.

2. Naphtho - [2,1-e] - tetrazolo-[5,1-c]-as-triazine, having the following formula:

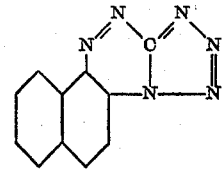

3. Naphtho - [2,1-e] - 3 - carboxy-s-triazolo-[5,1-c]-as-triazine, having the following formula:

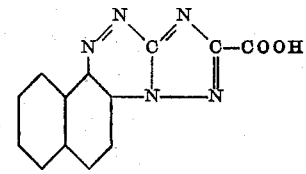

4. 6-sulfo-naphtho-[2,1-e] - tetrazolo-[5,1-c]-as-triazine, having the following formula:

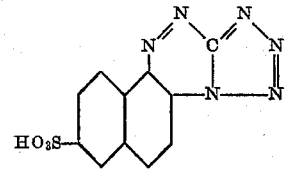

5. A process for preparing a heterocyclic compound of the class consisting of naphtho-[2,1-e]-s-triazolo-[5,1-c]-as-triazines and naphtho-[2,1-e]-tetrazolo-[5,1-c] - as - triazines which comprises heating a compound of the class consisting of tetrazole- and s-triazole-[5-azo-1]-naphthyl-2-amines and -2-monoalkylamines in acid medium to effect ring closure by elimination of the 2-amino group and a hydrogen atom.

6. A process for preparing a heterocyclic compound of the class consisting of naphtho-[2,1-e]-s-triazolo-[5,1-c]-as-triazines and naphtho-[2,1-e]-tetrazolo-[5,1-c] - as - triazines which comprises heating a compound of the class consisting of tetrazole- and s-triazole-[5-azo-1]-naphthyl-2-amines and -2-monoalkylamines in an aqueous solution of a strong acid.

7. A process for preparing naphtho-[2,1-e]-tetrazolo-[5,1-c]-as-triazine which comprises heating tetrazole-[5-azo-1]-naphthylamine-2 in an aqueous solution of a strong mineral acid, to effect ring closure with formation of an ammonium salt of the acid.

8. A process for preparing naphtho-[2,1-e]-3-carboxy-s-triazolo-[5,1-c]-as-triazine which comprises heating 3-carboxy-s-triazolo-[5-azo-1]-naphthylamine-2 in the aqueous solution of a strong mineral acid, to effect ring closure with formation of an ammonium salt of the acid.

9. A process for preparing 6-sulfo-naphtho-[2,1-e]-tetrazolo-[5,1-c]-as-triazine which comprises heating tetrazole-[5-azo-1]-6-sulfo-naphthylamine-2 in an aqueous solution of a strong mineral acid, to effect ring closure with formation of an ammonium salt of the acid.

JACK F. MORGAN.
HARRY W. GRIMMEL.

REFERENCES CITED

The following references are of record in the file of this patent:

J. fur Prat. Chemie, vol. 139, page 197 (1934).